(12) United States Patent
Priesnitz et al.

(10) Patent No.: US 7,555,889 B2
(45) Date of Patent: Jul. 7, 2009

(54) CHOPPER KNIFE FOR A STRAW CHOPPER

(75) Inventors: Rico Priesnitz, Lebach (DE); Peter Veit, Battweiler (DE)

(73) Assignee: Deere & Company, Moline, IL (US)

( * ) Notice: Subject to any disclaimer, the term of this patent is extended or adjusted under 35 U.S.C. 154(b) by 1102 days.

(21) Appl. No.: 10/845,682

(22) Filed: May 13, 2004

(65) Prior Publication Data

US 2005/0016630 A1   Jan. 27, 2005

(30) Foreign Application Priority Data

May 17, 2003  (DE)  .................. 103 22 337
Jul. 17, 2003  (DE)  .................. 103 32 363

(51) Int. Cl.
*A01D 34/42* (2006.01)

(52) U.S. Cl. ............................................. 56/504

(58) Field of Classification Search ............... 56/504, 56/500; 460/112; 241/243, 197; 411/229, 411/555
See application file for complete search history.

(56) References Cited

U.S. PATENT DOCUMENTS

| 513,834 | A | * | 1/1894 | Smith | 56/299 |
| 2,864,421 | A | * | 12/1958 | Schmidt | 83/665 |
| 3,581,604 | A | | 6/1971 | Malm | |
| 4,290,326 | A | * | 9/1981 | Ibach et al. | 76/101.1 |
| 5,042,973 | A | * | 8/1991 | Hammarstrand | 56/504 |
| 5,272,861 | A | * | 12/1993 | Roynberg | 56/504 |
| 6,478,674 | B2 | * | 11/2002 | Redekop | 460/112 |
| 6,511,374 | B2 | * | 1/2003 | VanEe | 460/112 |
| 6,840,854 | B2 | * | 1/2005 | Redekop | 460/112 |
| 6,857,255 | B1 | * | 2/2005 | Wilkey et al. | 56/296 |
| 6,953,398 | B1 | * | 10/2005 | Turner | 460/112 |
| 2002/0107056 | A1 | * | 8/2002 | VanEe | 460/112 |
| 2003/0060246 | A1 | * | 3/2003 | Bueermann et al. | 460/112 |
| 2003/0125098 | A1 | * | 7/2003 | Weichholdt | 460/112 |
| 2004/0259611 | A1 | * | 12/2004 | Dow | 460/112 |
| 2006/0025187 | A1 | * | 2/2006 | Farley | 406/112 |

FOREIGN PATENT DOCUMENTS

| DE | 36 26 456 | 11/1987 |
| DE | 36 31 485 | 3/1988 |
| DE | 38 23 116 | 1/1990 |
| EP | 0 479 329 | 4/1992 |
| EP | 1 295 524 | 3/2003 |
| WO | WO 91/10351 | 7/1991 |

* cited by examiner

*Primary Examiner*—Árpád Fábián-Kovács

(57) ABSTRACT

A chopper knife for a straw chopper has two side faces defining cutting edges. Each cutting edge is made up of two asymmetrical ground faces. The side faces are arranged at an angle with respect to the side faces. The cross section of the chopper knife in the region of the cutting edges is mirror-symmetric to the center plane of the chopper knife.

17 Claims, 7 Drawing Sheets

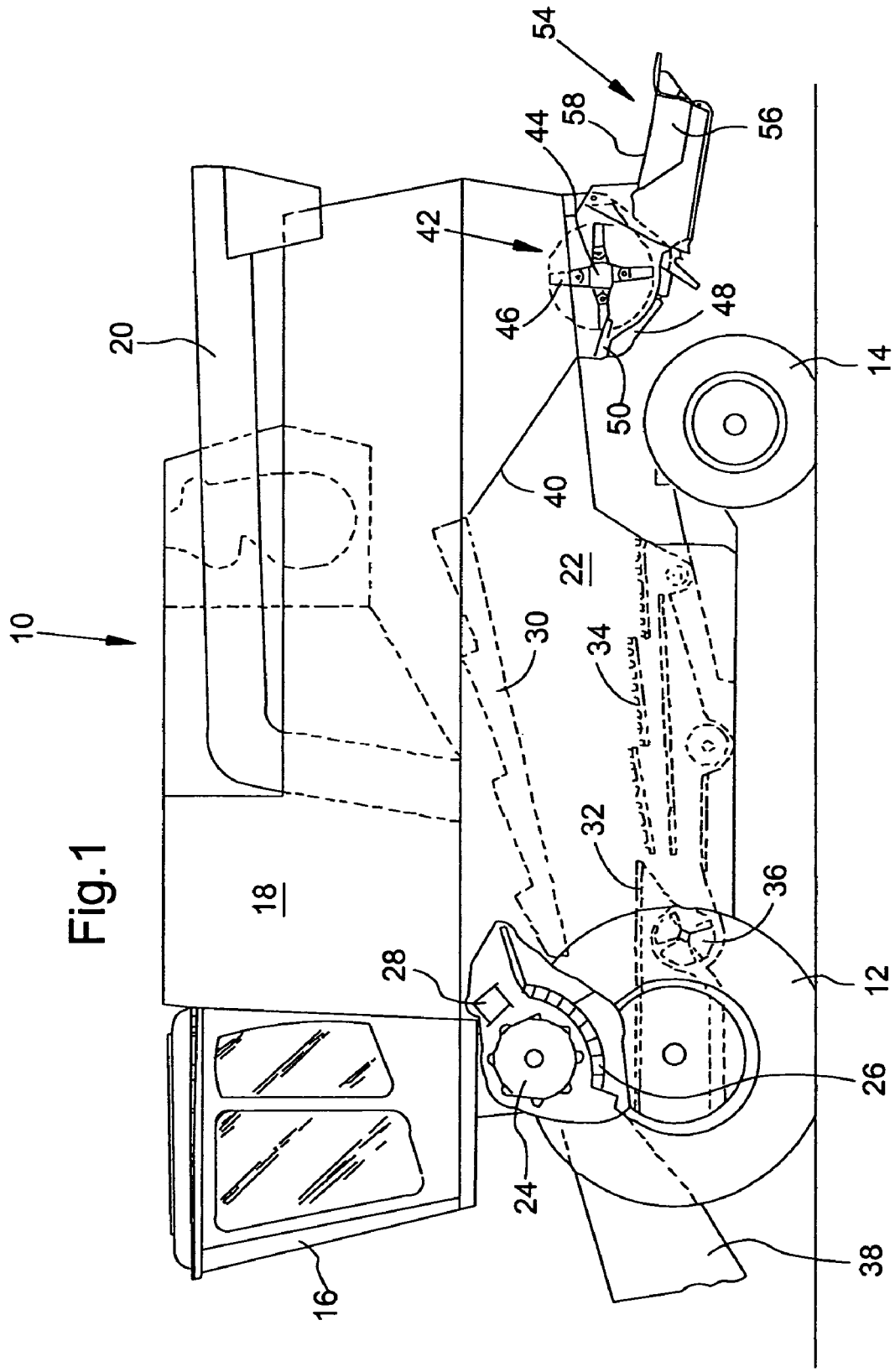

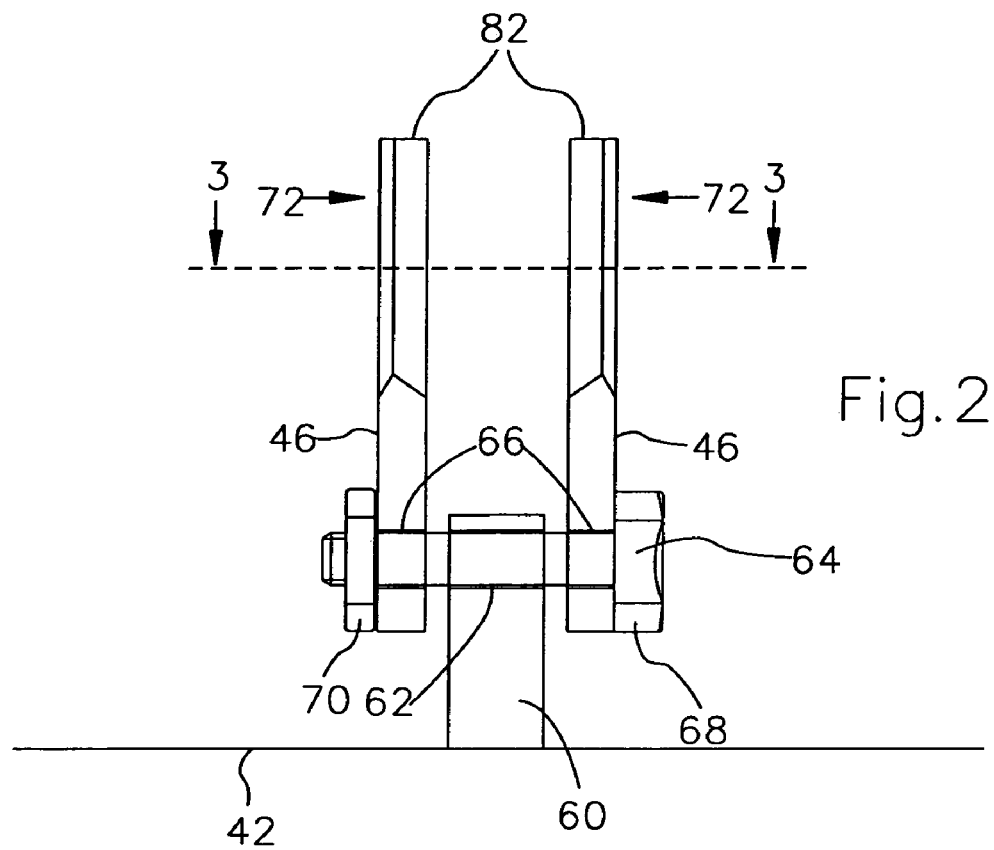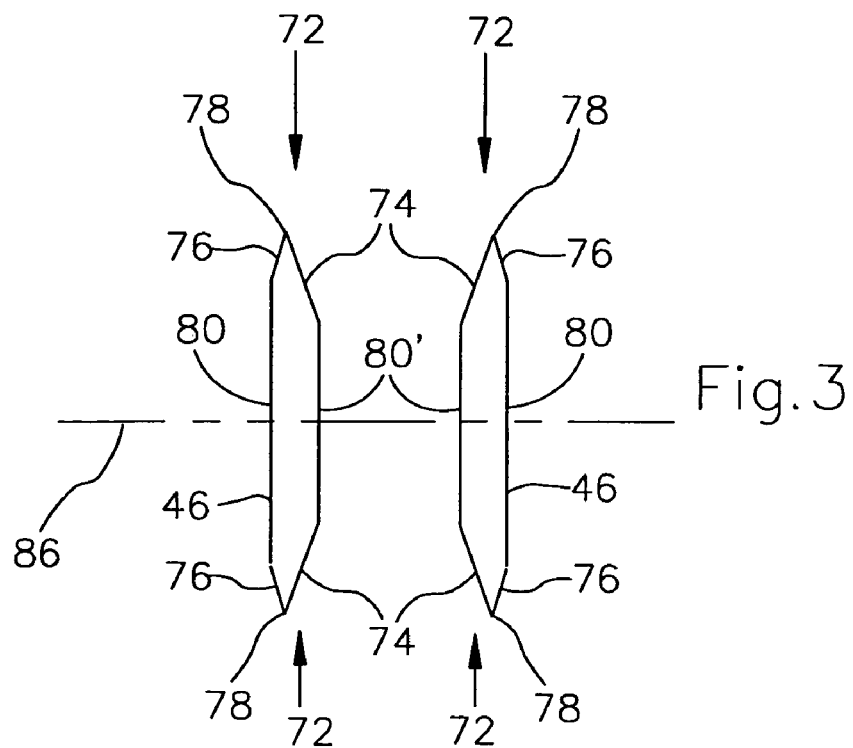

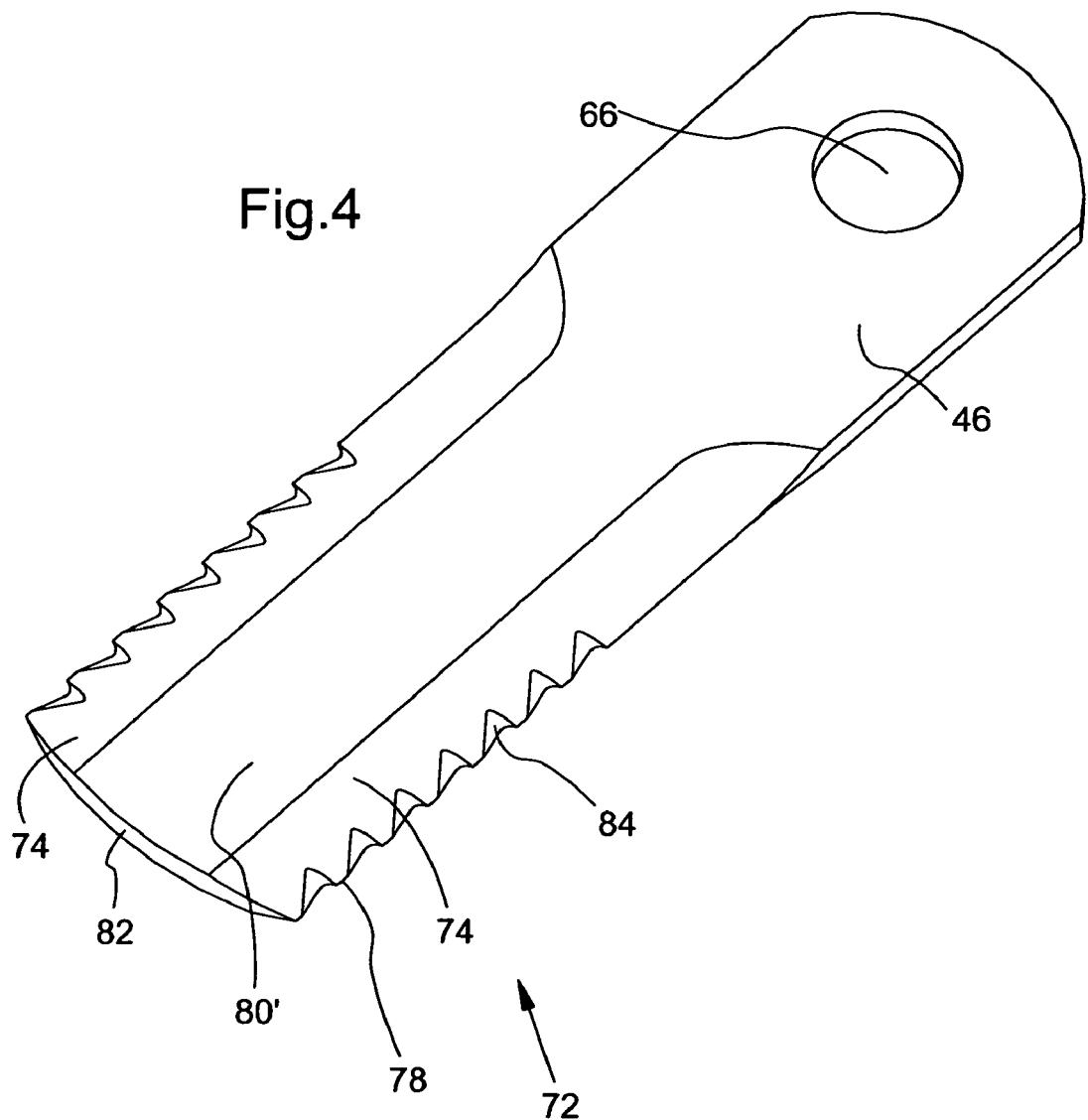

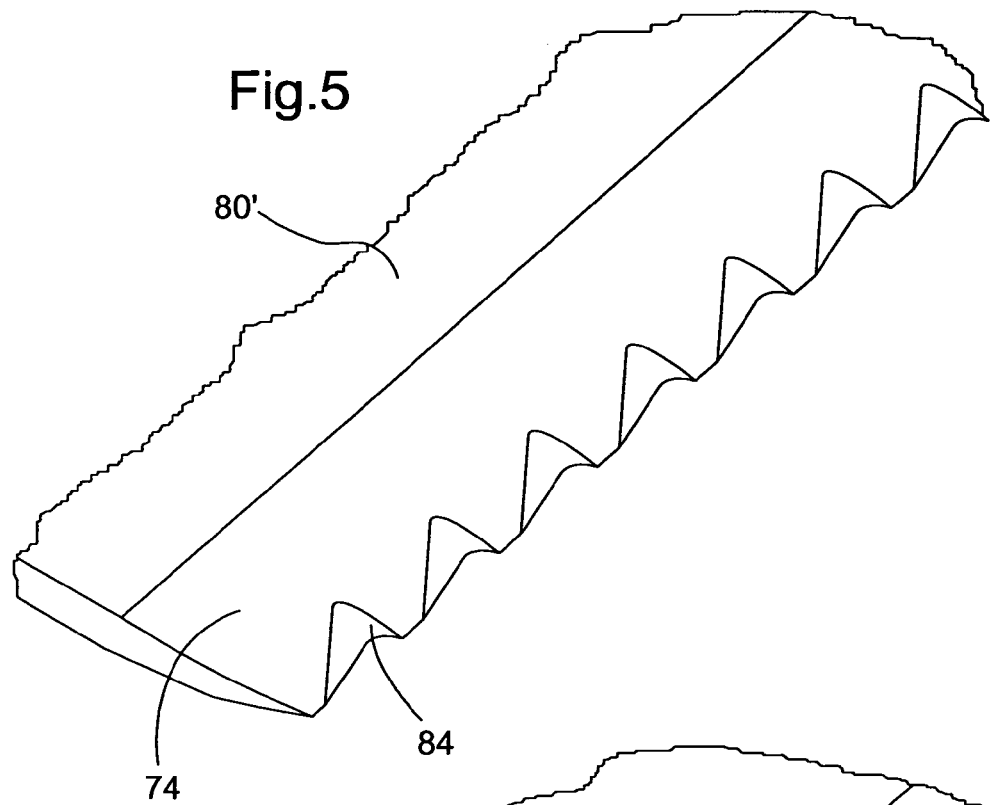
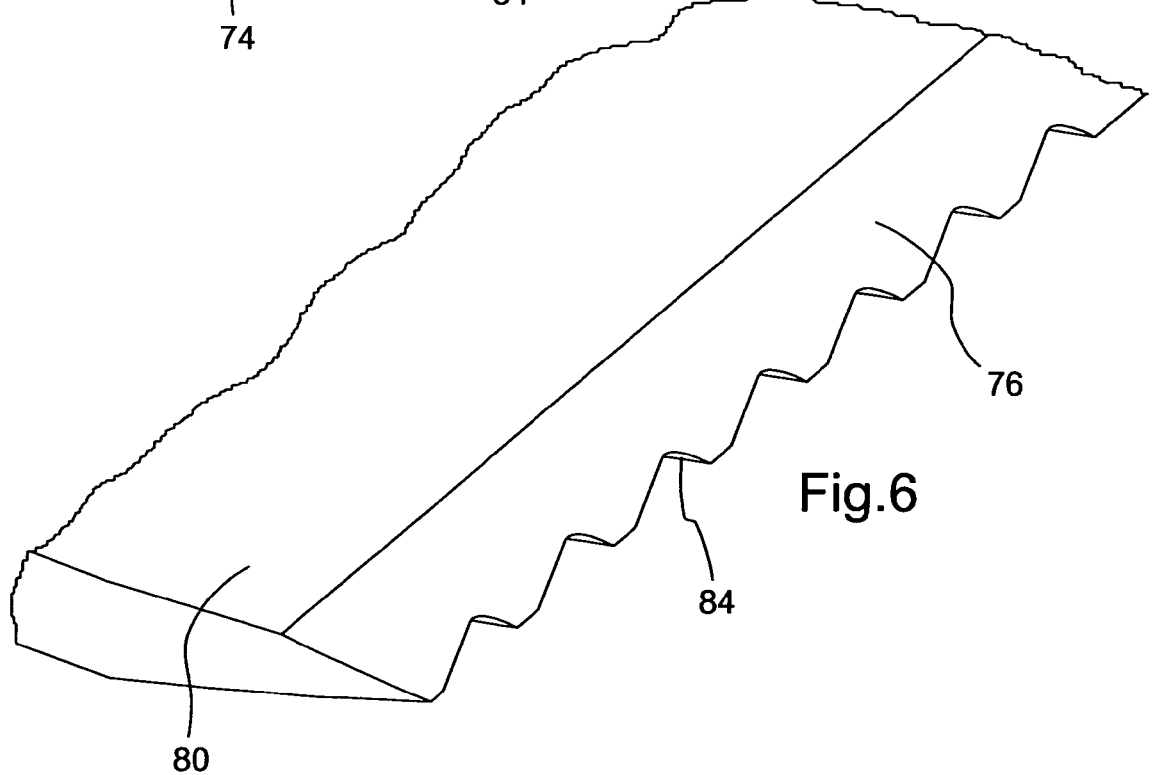

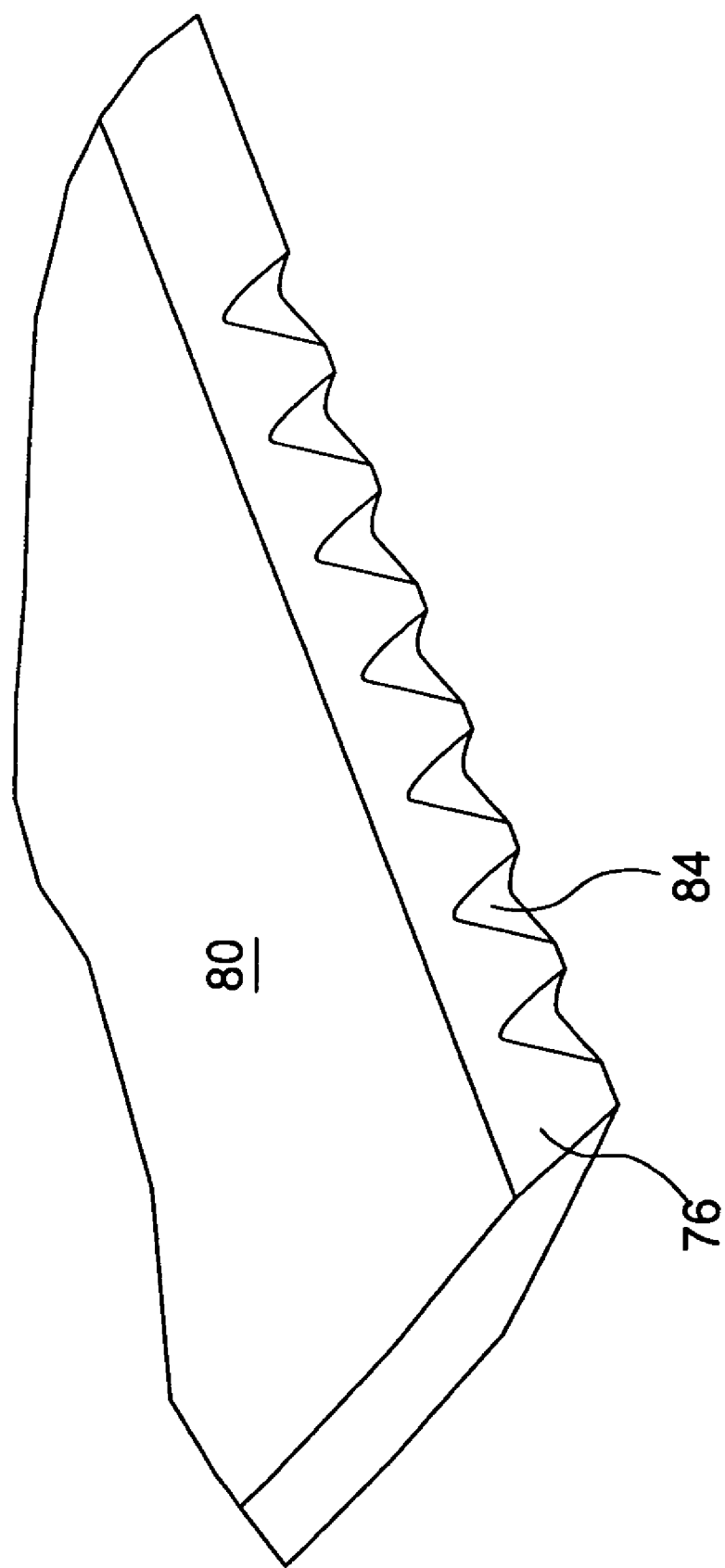

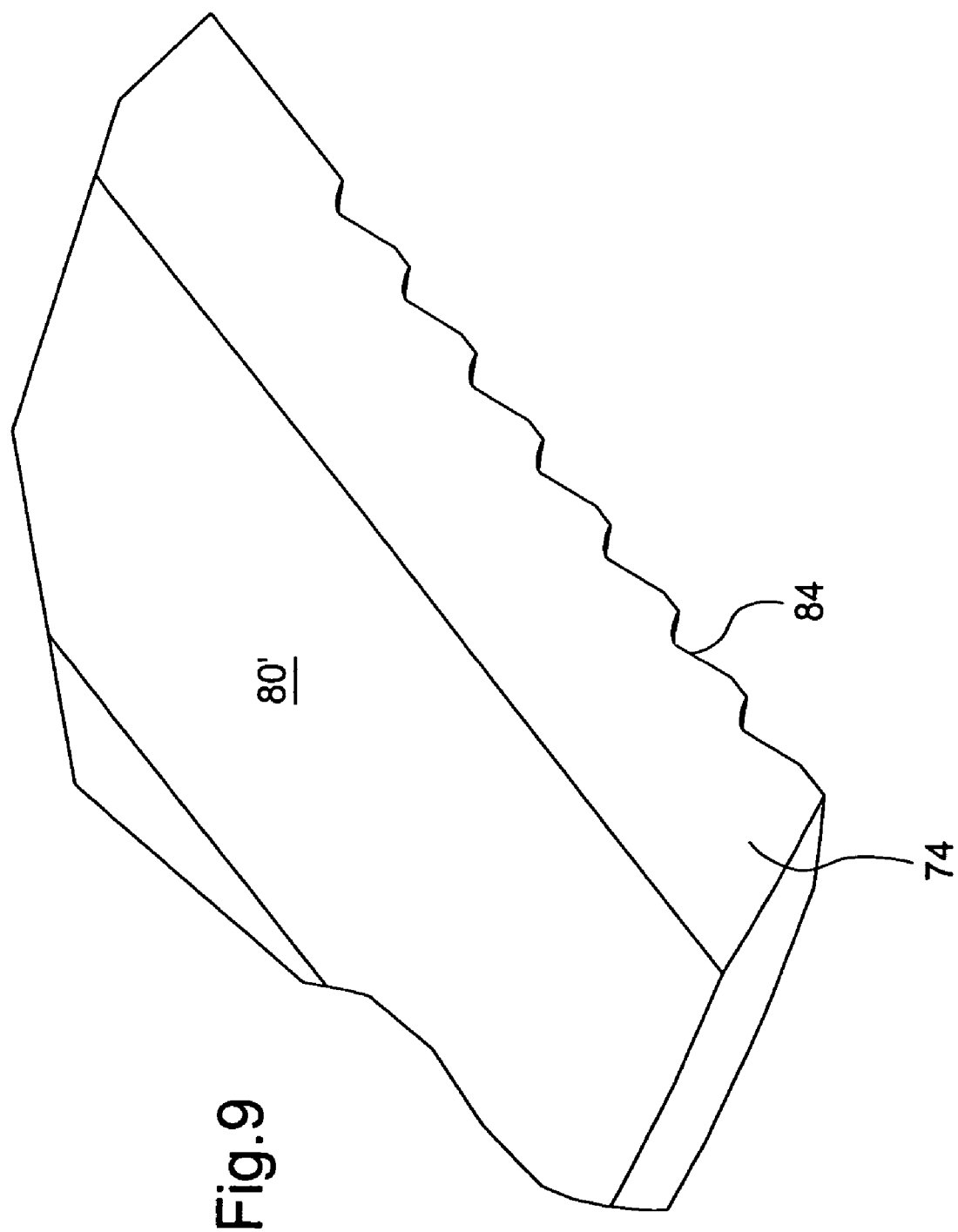

CHOPPER KNIFE FOR A STRAW CHOPPER

FIELD OF THE INVENTION

The present invention is directed to a chopper knife for a straw chopper having a cutting edge with two faces that are asymmetrical.

BACKGROUND OF THE INVENTION

EP 0 277 129 B discloses a straw chopper that comprises a housing with opposing knives and a rotatable rotor arranged therein. Pairs of chopper knives are suspended in pendular fashion from the rotor, wherein the leading edges of the chopper knives are provided with beveled faces that form sharp edges. In order to control the direction of distribution and the dispersion width of the chopped straw, the beveled faces of the suspended chopper knife pairs are arranged in an alternating configuration such that the beveled faces either point toward or away from each other. Thus, the chopper knives have a trapezoidal or rhomboidal cross section.

During the chopping process, this geometry leads to bending moments in the chopper knife, which cause vibrations that reduce the service life due to fatigue fractures.

DE 36 26 456 A proposes a straw chopper, in which pairs of knives are also arranged in pendular fashion on a rotor. The leading edges of the chopper knives are ground on one side so as to deflect the chopped straw in the desired direction. In order to ensure that the straw is thrown toward the rear rather than outwards in the central region of the chopper drum, chopper knives ground on both sides are provided at this location. In addition, the grinding configuration of the chopper knives may be realized such that it makes a transition from the edge ground on one side to the edge ground on both sides from the sides of the rotor toward the center. In one embodiment, the outer end face of the chopper knives has a convex radius. The chopper knives have cutting edges on the leading and trailing edges. In order to ensure that the alignment of the cutting edges remains the same after they are worn and must be turned around and that the ejecting direction remains constant, the cross-sectional surfaces of the chopper knives are arranged radially symmetric with respect to the longitudinal axis. With respect to asymmetric knives that are ground on both sides, this means that the shorter, leading ground section is respectively arranged on the opposite side face of the chopper knife relative to the shorter, trailing ground section of the chopper knife.

Aerodynamic influences also cause bending moments to be generated in chopper knives with this geometry, where these bending moments generate vibrations that shorten the service life of the chopper knife. In addition, the continuously varying grinding configuration of the chopper knives has the disadvantage that a large number of different chopper knives is required. This negatively affects the manufacture, shipping and storage of such chopper knives.

DE 36 31 485 A describes a straw chopper with chopper knives, the geometry of which corresponds to that of the chopper knives according to DE 36 26 456 A, except that the grinding configuration of the cutting edges consists of a serration in this case.

SUMMARY OF THE INVENTION

It is an object of the present invention to provide a chopper knife for a straw chopper having advantageous aerodynamics and a long service life.

The chopper knife is provided with two asymmetric and consequently different cutting edges that are respectively formed by two usually ground faces that are at an angle relative to the adjacent side face. The invention proposes that the cross section of the chopper knife mirror-symmetric relative to its center plane in the region of the cutting edges. Thus, the leading cutting edge of the chopper knife viewed in the moving direction is realized symmetrically relative to the trailing cutting edge.

The asymmetry of the two ground faces of a cutting edge makes it possible to separate the apices of the cutting edges from the center plane of the chopper knife in order to improve the aerodynamic effect of the cutting edges. However, the apices of the cutting edges may also lie on the center plane of the chopper knives, in which case the ground faces are shaped differently in order to effect the profile of a wing section. Since two ground faces are provided, the apices are also separated from the side faces such that the bending moments generated when the chopper knives come in contact with the material to be chopped are simultaneously reduced.

In principle, the angles between the side faces and the ground faces may be chosen arbitrarily. It proved advantageous to use respectively identical angles. However, it would also be conceivable to use different angles on the two faces that form a cutting edge. But due to the aforementioned mirror symmetry, the angles between the side faces and the adjacent ground faces are identical on the leading and the trailing cutting edge.

In order to increase the friction resistance on the outer end face of the chopper knife in the chopping mode, it is proposed to provide the outer end face with a radius in the plane defined by the side faces. This measure makes it possible to extend the service life of the chopper knife since the induced air resistance is reduced due to the elimination of sharp edges. In addition, a superior lateral distribution of the straw is effected since a larger projected end face is formed in the region of the greatest circumferential speed. The radius preferably corresponds at least approximately to the inside radius of the housing that accommodates the straw chopper rotor.

The radii on the apices of the cutting edges are advantageous because they prevent a premature separation of the air flow. This results in an improved air flow through the straw chopper and the service life of the chopper knives is simultaneously extended because the geometric notch effect is reduced.

In a preferred embodiment, the cutting edges include notches. It is preferred to arrange the serration in the direction of the respectively longer ground face of each cutting edge. In this case, the geometric notch is located in the region of the neutral bending axis of the chopper knife such that the stress peaks in the notch root due to bending stresses are reduced. This increases the fatigue strength of the chopper knife. In another embodiment that also performed well in empirical tests, the serrations are arranged in the direction of the respectively shorter ground face of each cutting edge.

The chopper knives according to the invention are particularly suitable for use in a generally known straw choppers that are equipped with a housing and a driven rotor arranged therein, wherein the axis of rotation of the rotor extends transverse to the driving direction of the combine. All chopper knives of a straw chopper preferably have the described cross section.

The chopper knives (preferably all chopper knives of a rotor) are usually mounted in pairs on suitable brackets of the rotor, namely in pendular fashion. In this respect, it is practical to arrange the sides of the chopper knives such that the respectively longer ground faces point toward one another.

The aerodynamic effect of the ground faces causes a negative pressure to be generated on the faces of the chopper knives which point toward one another and a positive pressure to be generated on the outer sides. Thus, the chopper knives stabilize one another.

BRIEF DESCRIPTION OF THE DRAWINGS

FIG. 1 is a schematic side view of a combine with a straw chopper.

FIG. 2 is a side view of the rotor of the straw chopper, wherein a pair of chopper knives is suspended in pendular fashion from said rotor.

FIG. 3 is a cross sectional view through the chopper knives along line 3-3 in FIG. 2.

FIG. 4 is a perspective view of a chopper knife.

FIG. 5 is an enlarged perspective view of a cutting edge of the chopper knife.

FIG. 6 is an enlarged perspective view of the opposite cutting edge of the chopper knife.

FIG. 8 is an enlarged perspective view of the cutting edge of the chopper knife according to FIG. 6.

FIG. 9 is an enlarged perspective view of the opposite cutting edge of the chopper knife according to FIG. 6.

DETAILED DESCRIPTION

Figure 7:
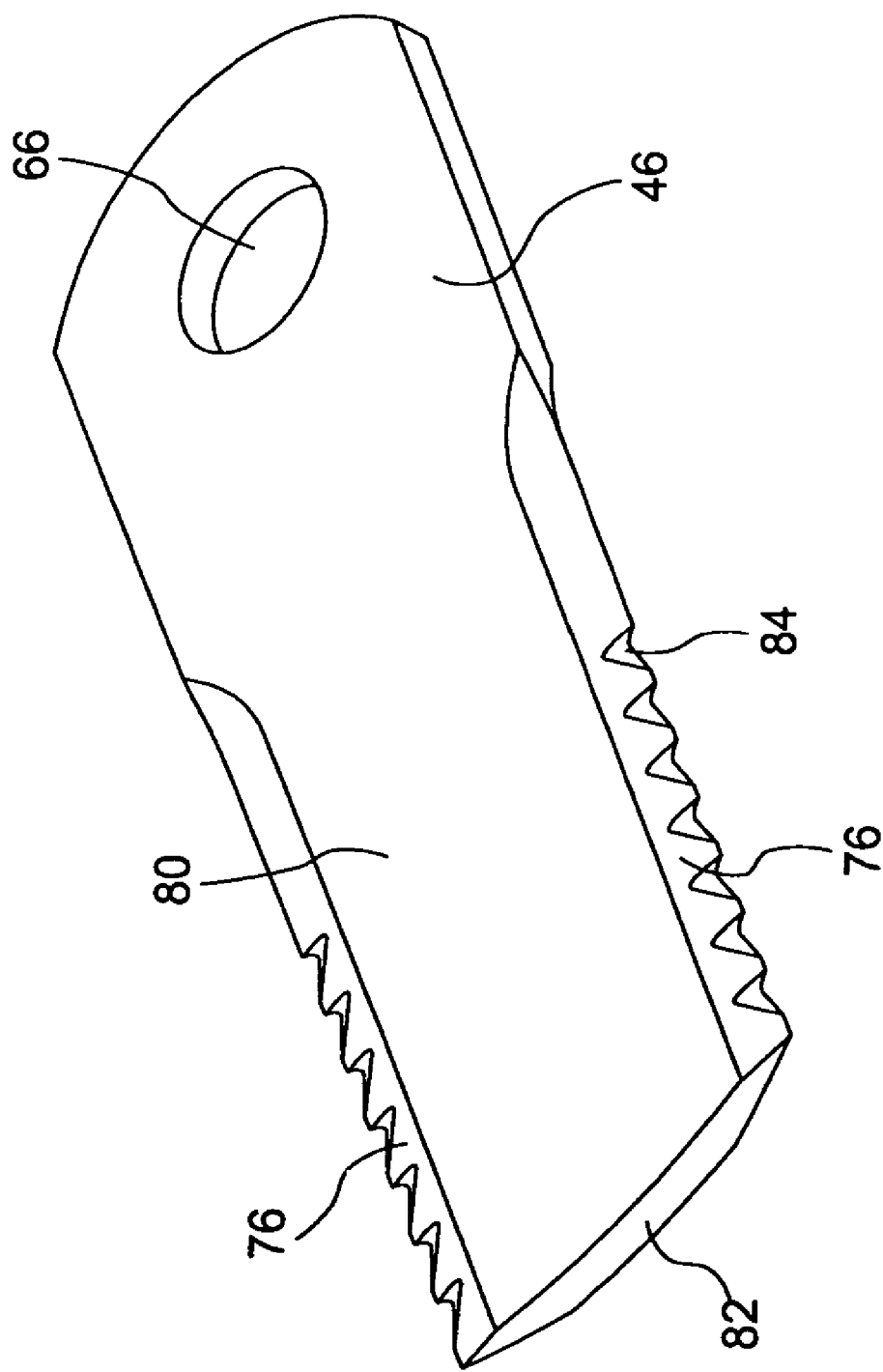
FIG. 7 is a perspective view of a second embodiment of a chopper knife.

FIG. 1 shows a harvesting machine 10 in the form of a combine that is supported on driven front wheels 12 and steerable rear wheels 14. The harvesting machine 10 comprises and operators cab 16, from which the combine can be controlled by a driver. A grain bin 18 is located behind the operators cab 16 and is provided with a discharge auger 20 for discharging harvested crop material from the grain bin 18. A frame 22 supports the grain bin 18, as well as a threshing cylinder 24, a threshing concave 26 and a beater 28. The threshing cylinder 24, the threshing concave 26 and the beater 28 are used to separate the harvested crop into larger and smaller components. The threshed crop material is also separated on adjoining straw walkers 30, as well as on a grain pan 32. The threshed and separated crop is cleaned on sieves 34 by an air blast passing upwardly through the sieves 34 by a cleaning fan 36. The cleaned crop is ultimately transported into the grain bin 18. The larger non-grain crop components are fed into a straw chopper 42 from the straw walkers 30 by a straw guide plate 40. The light weight non-grain crop components are blown from the sieves 34 onto the ground by means of the cleaning fan 36, if applicable, the light weight non-grain crop components may also be expelled with the aid of additional chaff spreaders or the straw chopper 42. The harvested crop it is transferred from the field to the threshing cylinder 24 by a feeder house 38. The feeder house 38 made be provided with a rock trap.

The straw chopper 42 comprises a hollow-cylindrical rotor 44 with chopper knives 46 that are suspended in pendular fashion over its circumference and its length. The rotor is connected to a drive unit in a housing 48 in such a way that it rotates about an axis that extends horizontally and transverse to the driving direction. The threshed larger crop components are comminuted into chaff in cooperation with opposing stationary knives 50. A distributing device 54 is arranged on the rear side of the straw chopper 42 and is provided with a series of guide elements 56 in the form of straw guide plates that are arranged laterally and adjacent to one another and beneath a straw distributing hood 58. The illustrated distributing device 54 is a non-powered distributing device, but a power distributing device could also be used.

According to FIG. 2, pairs of chopper knives 46 are suspended in pendular fashion on holding brackets 60 that are mounted on the rotor 44. The holding brackets 60 contain bores 62 that extend in the axial direction of the rotor 44, wherein a bolt 64 extends through each bore. The bolt 64 also extends through holes 66 arranged in the ends of the chopper knives 46 and is fixed with a nut 70 on its opposite end relative to the head 68. The diameters of the bores 62 and the holes 66 are chosen such that the chopper knives 46 are able to swing freely in a pendular fashion.

The chopper knives 46 are provided with cutting edges 72 that extend over approximately 60% of the length of the chopper knives 46 in the region that points away from the rotor 44, i.e., on their leading and trailing edges relative to the direction of rotation of the rotor 44.

The geometry of the cutting edges 72 is shown in greater detail in FIG. 3, in the form of a cross section through the chopper knives 46 along line 3-3 in FIG. 2. The chopper knives 46 are significantly longer in the direction of rotation of the rotor 44 than in the axial direction of the rotor 44. The cutting edges 72 are respectively formed by a ground face 74 that points inwardly or toward the adjacent chopper knife 46 and a ground face 76 that points outwardly.

All inner ground faces 74 have the same length and respectively form the same angle with the adjacent side face 80' of the chopper knife 46. Analogously, all outer ground faces 76 have the same length and respectively form the same angle with the adjacent side face 80 of the chopper knife 46. The angles between the outer faces 76 and the adjacent side faces 80 correspond at least approximately to the angles between the inner faces 74 and the adjacent side faces 80'. A suitable value for this angle is about 14 degrees.

The apices 78 of the cutting edges 72 consequently are not arranged centrally between the side faces 80, but rather are shifted outwardly. The outer side faces 80 are also longer than the inner side faces 80'. The cross sections of the chopper knives 46 are realized mirror-symmetric relative to their center plane 86 (which intersects the centers of the side faces 80, 80'). When the chopper knives 46 must be turned around after a certain length of operating time such that the other cutting edges 72 come in contact with the material to be chopped, the bolts 64 are removed, the chopper knives 46 are exchanged, and the bolts 64 are reattached. The fresh cutting edges 72 are now positioned at the locations that were previously occupied by the worn cutting edges 72. Mistakes can be minimized by providing suitable markings on the rotor 44 and/or the chopper knives 46.

During the operation of the straw chopper, the asymmetric arrangement of the cutting edges 72 results in aerodynamics that approximately correspond to that of a wing. A negative pressure is generated on the inner side between the chopper knives 46 and a positive pressure is generated on the outer sides of the chopper knives 46. Thus, the chopper knives attract one another to a certain degree. The mirror-symmetric design of the chopper knives prevents torsional stresses in the chopper knives 46, which are caused by the aerodynamics and disadvantageously influence the service life. In addition, the air flow speed in the straw chopper 42 is increased in comparison with the prior art, wherein this increased air flow speed can be used to effect a superior lateral distribution of the straw. The approximately central arrangement of the apices 78 of the cutting edges 72 ensures that the chopper knives only bend slightly when they come in contact with the material to be chopped and that undesirable bending stresses are prevented.

FIGS. 4-6 show notches 84 that are arranged in the cutting edges 72. The serration formed by the notches 84 is arranged in the direction of the longer face 74. The notches 84 are formed by only removing material from the inner, longer ground faces 74 of the cutting edges 72 such that these faces 74 are also provided with depressions that form part of the notches 84 at a distance from the apex 78, while the outer faces 76 are essentially flat and only their outer edge follows the course of the notches 84. Thus, the geometric notch is situated in the region of the neutral bending axis of the chopper knife 46. Stress peaks in the notch root due to bending stresses are reduced, and the fatigue strength of the chopper knife 46 is increased. The relatively large radius of the notch root 84 significantly reduces the notch effect.

The outer end face 82 of the chopper knives 46 is provided with a radius in the chopper knife plane. This results in a larger projected end face in the region of the highest circumferential speed such that the friction resistance is increased in chopping mode and material flow and flow speed are improved. In addition, the air flow through the straw chopper 42 and thus the lateral distribution of the straw are improved because the induced air resistance is prevented. In addition, the radii arranged on the apices of the cutting edges 72 prevent the air flow from separating prematurely.

The hardness of the chopper knives 46 may be in the range of 55-58 HRC in the region of the cutting edge 72 and 37-40 HRC in the core. The hardness should progress harmoniously in order to prevent metallurgic notches. This hardness profile also prevents geometric notches from coinciding in the region of the knife serration, as well as metallurgic notches due to a decreasing hardness. A largely homogenous structure of the chopper knife material can be achieved with a heat treatment in order to prevent metallurgic notches. This means that the carbon should not be incorporated in an acicular manner.

FIGS. 7-9 show oblique views of a second embodiment of the chopper knife 46 according to the invention. Elements that correspond to the previously described embodiment are designated by the same reference numbers. The difference in comparison with the embodiments according to FIGS. 4-6 is that the notches 84 are arranged in the shorter ground face 76. These chopper knives 46 performed well in empirical tests.

Having described the illustrated embodiments, it will become apparent that various modifications can be made without departing from the scope of the invention as defined in the accompanying claims.

The invention claimed is:

1. A chopper knife for a straw chopper, the chopper knife having a center plane and two side faces defining two cutting edges, the cutting edges comprise two faces that are both arranged at an angle relative to the side faces, and where the faces of each cutting edge are asymmetric, characterized by the fact that the cross section of the chopper knife is mirror-symmetric relative to the center plane of the chopper knife in the region of the cutting edges.

2. The chopper knife as defined by claim 1, wherein the cutting edges are provided with apices, the apices of the cutting edges are separated from the center plane of the chopper knife.

3. The chopper knife as defined by claim 2, wherein the respective angles between the faces and the side faces are identical.

4. The chopper knife as defined by claim 3, wherein the chopper knife is provided with an outer face, the outer end face is provided with a radius in the plane defined by the side faces.

5. The chopper knife as defined by claim 4, wherein the apices of the cutting edges are provided with radii.

6. The chopper knife as defined by claim 5, wherein the cutting edges are provided with notches forming serrations.

7. The chopper knife as defined by claim 6, wherein each cutting edge has a longer face and a shorter face, the notches forming the serrations are arranged towards the longer face.

8. The chopper knife as defined by claim 6, wherein each cutting edge has a longer face and a shorter face, the notches forming the serrations are arranged towards the shorter face.

9. A straw chopper comprising:
a housing;
a rotor located in the housing; chopper knives are pendular mounted to the rotor, each chopper knife has a center plane and two side faces defining two cutting edges, the cutting edges comprise two faces that are both arranged at an angle relative to the side faces, and where the faces of each cutting edge are asymmetric, characterized by the fact that the cross section of the chopper knife is mirror-symmetric relative to the center plane of the chopper knife in the region of the cutting edges.

10. The straw chopper as defined by claim 9, wherein pairs of chopper knives are respectively mounted in pendular fashion on the rotor.

11. The straw chopper as defined by claim 10, wherein each cutting edge has a longer face and a shorter face, the longer faces of the chopper knife pairs point toward one another.

12. A chopper knife (46) for a straw chopper (42) has two side faces (80,80') with two ends and cutting edges (72) which are disposed at the two ends of the side faces (80,80') and are formed by two surfaces (74, 76) arranged at an angle to the side faces (80,80'), wherein the cross-section of the chopper knife (46) in the region of the cutting edges (72) has mirror symmetry about a central plane (86) of the chopper knife (46) intersecting the middle of the side faces (80,80'), and further wherein the surfaces of each cutting edge (72) are asymmetrical.

13. A chopper knife (46) according to claim 12, wherein tips of the cutting edges (72) are spaced from the central plane (86) of the chopper knife (46).

14. A chopper knife (46) according to claim 12, wherein the angles between the surfaces (74, 76) and the side faces (80, 80') are equal.

15. A chopper knife (46) according to claim 12, wherein an outer end (82) in the plane defined by the side faces (80, 80') is radiused.

16. A chopper knife (46) according to claim 12, wherein the edges (72) are provided with notches (84).

17. A chopper knife (46) according to claim 16, wherein each cutting edge (72) has a longer face (74) and a shorter face (76), and the notches (84) are arranged towards the longer face (74).

* * * * *